United States Patent
Awoniyi-Oteri et al.

(10) Patent No.: US 11,917,460 B2
(45) Date of Patent: Feb. 27, 2024

(54) USER EQUIPMENT HANDOVER

(71) Applicant: QUALCOMM Incorporated, San Diego, CA (US)

(72) Inventors: Olufunmilola Omolade Awoniyi-Oteri, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 16/832,912

(22) Filed: Mar. 27, 2020

(65) Prior Publication Data

US 2020/0329405 A1 Oct. 15, 2020

Related U.S. Application Data

(60) Provisional application No. 62/832,046, filed on Apr. 10, 2019.

(51) Int. Cl.
*H04W 36/00* (2009.01)
*H04W 16/28* (2009.01)
(Continued)

(52) U.S. Cl.
CPC ....... *H04W 36/0027* (2013.01); *H04W 16/28* (2013.01); *H04W 36/0058* (2018.08);
(Continued)

(58) Field of Classification Search
CPC ......... H04W 36/0027; H04W 36/0058; H04W 16/28; H04W 72/0446; H04W 72/14;
(Continued)

(56) References Cited

U.S. PATENT DOCUMENTS

2018/0332520 A1 11/2018 Cheng et al.
2020/0059867 A1* 2/2020 Haghighat .......... H04W 52/285
(Continued)

FOREIGN PATENT DOCUMENTS

WO 2018204863 A1 11/2018

OTHER PUBLICATIONS

Intel Corporation: "Mobility Type Support for Multiple Beams in NR", 3GPP Draft, 3GPP TSG RAN WG2 Meeting #ah-18513, R2-1700342, 3rd Generation Partnership Project (3GPP), Mobile Competence Centre, 650, Route Des Lucioles, F-06921 Sophia-Antipolis Cedex, France, vol. RAN WG2, No. Spokane, Wa, Jan. 17, 2017-Jan. 19, 2017, Jan. 7, 2017 (Jan. 7, 2017), XP051203985, 6 pages, Retrieved from the Internet: URL: http://www.3gpp.org/ftp/tsg_ranJWG2_RL2/TSGR2_AHs/2017_01_NR/Docs/. [retrieved on Jan. 7, 2017] the whole document).
(Continued)

*Primary Examiner* — Hashim S Bhatti
(74) *Attorney, Agent, or Firm* — Harrity & Harrity, LLP

(57) ABSTRACT

Various aspects of the present disclosure generally relate to wireless communication. In some aspects, a user equipment (UE) may receive, from a source base station (BS), a handover message or the beam or panel selection message including multi-beam or multi-panel information identifying a first one or more beams or panels to remain with the source BS and a second one or more beams or panels to switch from the source BS to a target BS during a handover procedure. The UE may perform the handover procedure to switch from the source BS to the target BS with the first one or more beams or panels for communication with the source BS and the second one or more beams or panels for communication with the target BS. Numerous other aspects are provided.

29 Claims, 15 Drawing Sheets

(51) Int. Cl.
*H04W 72/0446* (2023.01)
*H04W 72/23* (2023.01)

(52) U.S. Cl.
CPC ....... *H04W 72/0446* (2013.01); *H04W 72/23* (2023.01); *H04W 74/0833* (2013.01)

(58) Field of Classification Search
CPC ......... H04W 74/0833; H04W 36/0069; H04W 36/0085; H04B 7/022; H04B 7/0408; H04B 7/0691; H04B 7/0695
See application file for complete search history.

(56) References Cited

U.S. PATENT DOCUMENTS

2020/0107235 A1* 4/2020 Peisa ................. H04W 36/0061
2020/0154326 A1* 5/2020 Deenoo ................. H04W 24/08

OTHER PUBLICATIONS

International Search Report and Written Opinion—PCT/US2020/025783—ISA/EEP—dated Jun. 15, 2020.
Apple Inc: "Consideration on Beam Measurement and Reporting Enhancement", 3GPP Draft, 3GPP TSG RAN WG1 #96, R1-1902768, Consideration on Beam Measurement and Reporting Enhancement, 3rd Generation Partnership Project (3GPP), Mobile Competence Centre, 650, Route Des Lucioles, F-06921 Sophia-Antipolis, vol. RAN WG1, No. Athens, Greece, Feb. 25, 2019-Mar. 1, 2019, Feb. 16, 2019 (Feb. 16, 2019), XP051600463, 9 pages, Retrieved from the Internet: URL: http://www.3gpp.org/ftp/tsg%5Fran/WG1%5FRL1/TSGR1%5F96/Docs/R1%2D1902768%2Ezip. [retrieved on Feb. 16, 2019] para.6.
Qualcomm Incorporated: "LTE Mobility Enhancements for eMBB HO Using Dual Active Protocol Stack", 3GPP Draft, 3GPP TSG-RAN WG2 Meeting #105bis, R2-1904646_LTE Mobility Enhancements for eMBB HO Using Dual Active Protocol Stack V2. 3rd Generation Partnership Project (3GPP), Mobile Competence Centre, 650, Route Des Lucioles, F-06921, vol. Ran WG2, No. Xian. China; Apr. 8, 2019-Apr. 12, 2019, Apr. 6, 2019 (Apr. 6, 2019), XP051701936, 10 pages, Retrieved from the Internet: URL: http://www.3gpp.org/ftp/Meetings%5F3GPP%5FSYNC/RAN2/Docs/R2%2D1904646%2Ezip. [retrieved on Apr. 6, 2019], whole document.

* cited by examiner

USER EQUIPMENT HANDOVER

CROSS-REFERENCE TO RELATED APPLICATION

This patent application claims priority to U.S. Provisional Patent Application No. 62/832,046, filed on Apr. 10, 2019, entitled "USER EQUIPMENT HANDOVER," and assigned to the assignee hereof. The disclosure of the prior application is considered part of and is incorporated by reference in this patent application.

FIELD OF THE DISCLOSURE

Aspects of the present disclosure generally relate to wireless communication, and more techniques and apparatuses for user equipment handover.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) may include receiving, from a source base station (BS), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure; and performing the handover procedure to switch from the source BS to the target BS with the first one or more beams or panels for communication with the source BS and the second one or more beams or panels for communication with the target BS.

In some aspects, a UE for wireless communication may include memory and one or more processors operatively coupled to the memory. The memory and the one or more processors may be configured to receive, from a source base station (BS), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure; and perform the handover procedure to switch from the source BS to the target BS with the first one or more beams or panels for communication with the source BS and the second one or more beams or panels for communication with the target BS.

In some aspects, a non-transitory computer-readable medium may store one or more instructions for wireless communication. The one or more instructions, when executed by one or more processors of a UE, may cause the one or more processors to: receive, from a source base station (BS), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure; and perform the handover procedure to switch from the source BS to the target BS with the first one or more beams or panels for communication with the source BS and the second one or more beams or panels for communication with the target BS.

In some aspects, a method of wireless communication, performed by a source station (BS), may include transmitting, to a user equipment (UE), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure; and performing the handover procedure to switch the UE from the source BS to the target BS with the first one or more beams or panels for communication with the source BS and the second one or more beams or panels for communication with the target BS.

In some aspects, a BS for wireless communication may include memory and one or more processors operatively coupled to the memory. The memory and the one or more processors may be configured to transmit, to a user equipment (UE), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure; and perform the handover procedure to switch the UE from the source BS to the target BS with the first one or more beams or panels for communication with the source BS and the second one or more beams or panels for communication with the target BS.

In some aspects, a target BS for wireless communication may include memory and one or more processors operatively coupled to the memory. The memory and the one or more processors may be configured to receive a trigger to perform a handover procedure for a user equipment (UE); and communicate with the UE to perform a dual active protocol stack (DAPS) handover procedure or a concurrent connectivity handover procedure to switch the UE from a source BS to the target BS with a first one or more beams or panels for communication with the source BS and a second one or more beams or panels for communication with the target BS during the handover procedure.

In some aspects, a method of wireless communication, performed by a target base station (BS), may include receiving a trigger to perform a handover procedure for a user equipment (UE); and communicating with the UE to perform a dual active protocol stack (DAPS) handover procedure or a concurrent connectivity handover procedure to switch the UE from a source BS to the target BS with a first one or more beams or panels for communication with the source BS and a second one or more beams or panels for communication with the target BS during the handover procedure.

In some aspects, a non-transitory computer-readable medium may store one or more instructions for wireless communication. The one or more instructions, when executed by one or more processors of a source B S, may cause the one or more processors to: transmit, to a user equipment (UE), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure; and perform the handover procedure to switch the UE from the source BS to the target BS with the first one or more beams or panels for communication with the source BS and the second one or more beams or panels for communication with the target BS.

In some aspects, a non-transitory computer-readable medium may store one or more instructions for wireless communication. The one or more instructions, when executed by one or more processors of a target BS, may cause the one or more processors to: receive a trigger to perform a handover procedure for a user equipment (UE); and communicate with the UE to perform a dual active protocol stack (DAPS) handover procedure or a concurrent connectivity handover procedure to switch the UE from a source BS to the target BS with a first one or more beams or panels for communication with the source BS and a second one or more beams or panels for communication with the target BS during the handover procedure.

In some aspects, an apparatus for wireless communication may include means for receiving, from a source base station (BS), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure; and means for performing the handover procedure to switch from the source BS to the target BS with the first one or more beams or panels for communication with the source BS and the second one or more beams or panels for communication with the target BS.

In some aspects, an apparatus for wireless communication may include means for transmitting, to a user equipment (UE), a handover message or a beam or panel selection message including multi-beam or multi-panel information identifying a first one or more beams or panels to remain with the apparatus and a second one or more beams or panels to switch from the apparatus to a target BS during a dual active protocol stack (DAPS) handover procedure or a concurrent connectivity handover procedure; and means for performing the handover procedure to switch the UE from the apparatus to the target BS with the first one or more beams or panels for communication with the apparatus and the second one or more beams or panels for communication with the target BS.

In some aspects, an apparatus for wireless communication may include means for receive a trigger to perform a handover procedure for a user equipment (UE); and means for communicating with the to perform a dual active protocol stack (DAPS) handover procedure or a concurrent connectivity handover procedure to switch the UE from a source BS to the apparatus with a first one or more beams or panels for communication with the source BS and a second one or more beams or panels for communication with the apparatus during the handover procedure.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
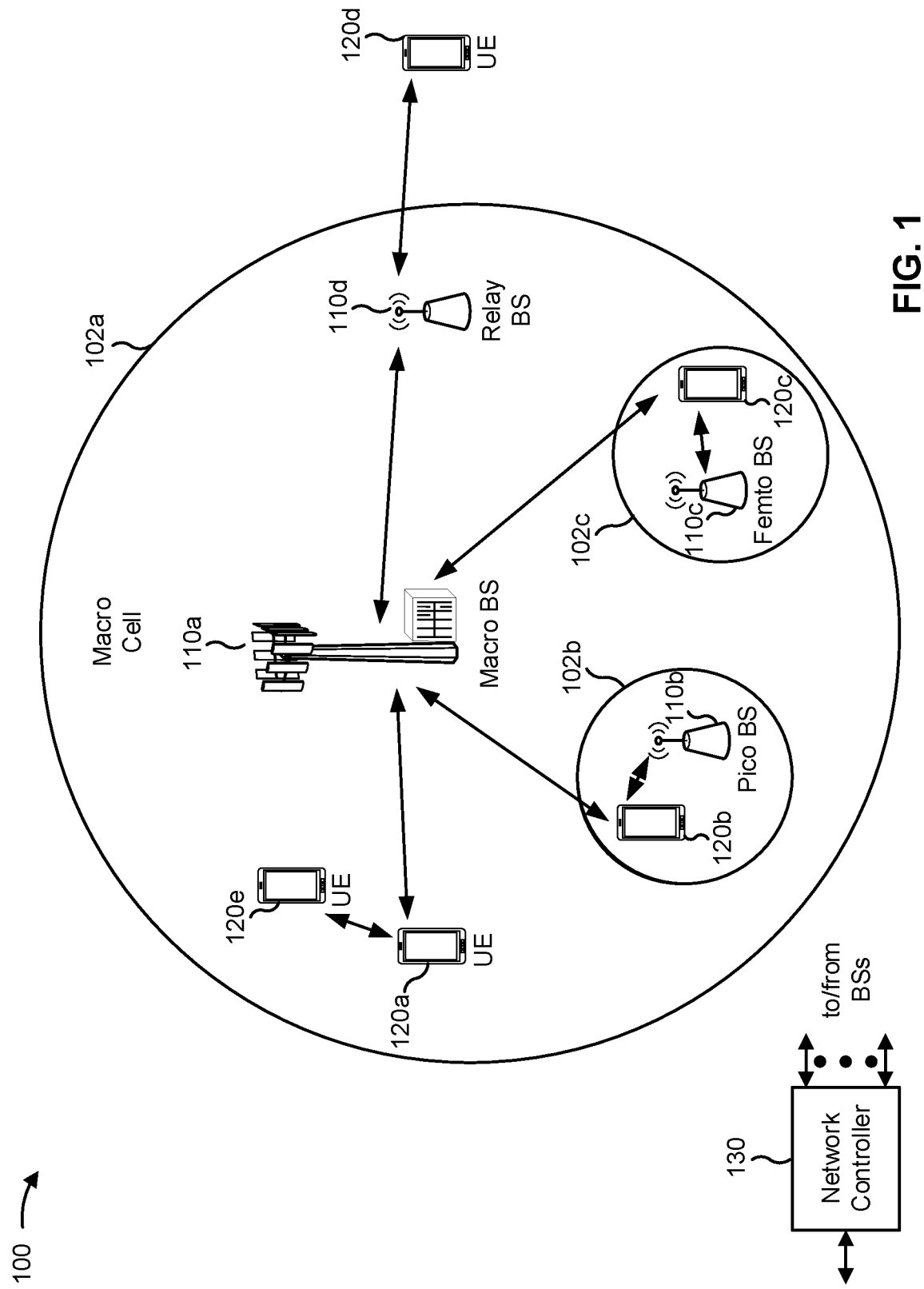
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
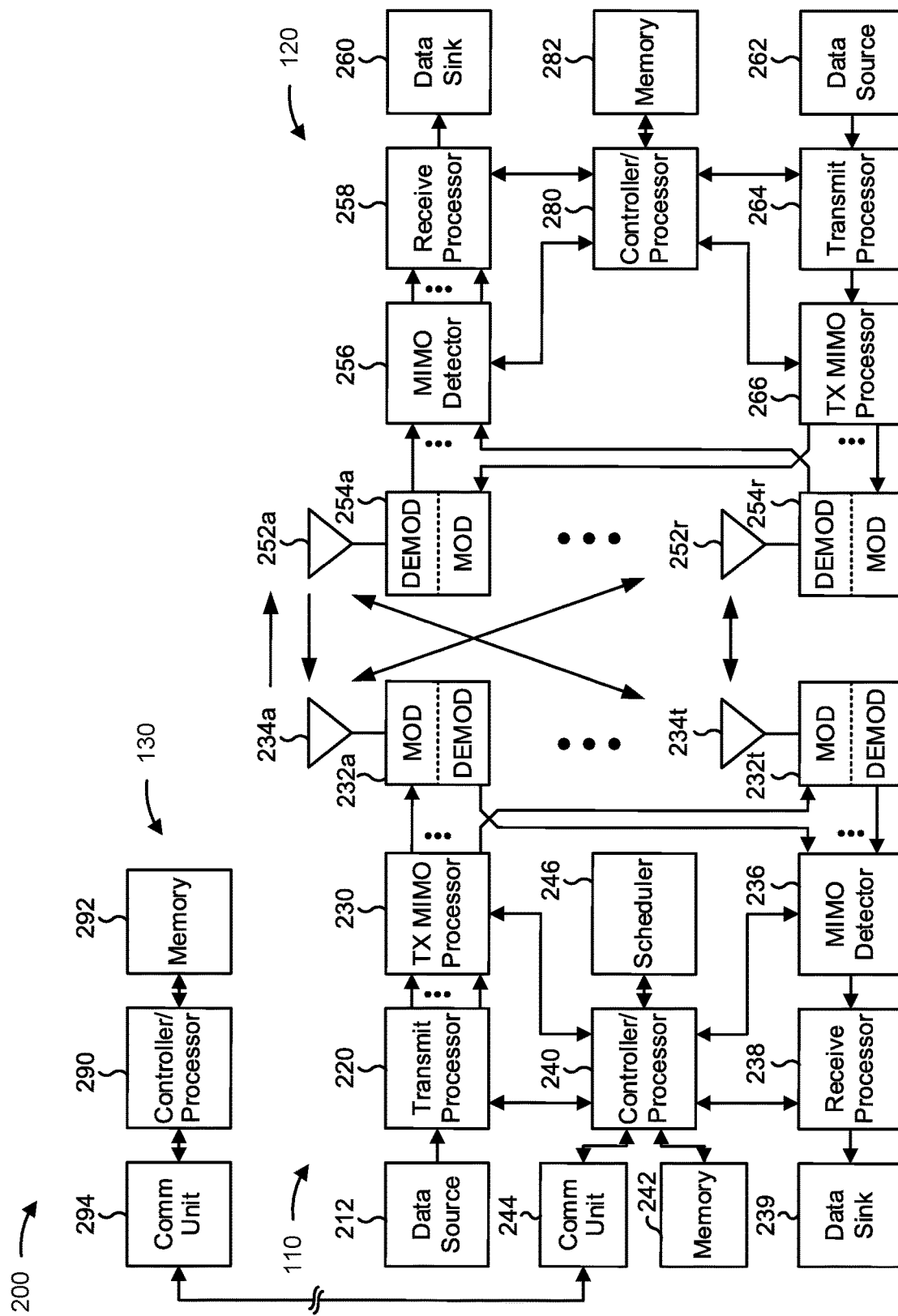
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with user equipment handovers, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, process 1400 of FIG. 14, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a source BS, a handover message or the beam or panel selection message including multi-beam or multi-panel information identifying a first one or more beams or panels to remain with the source BS and a second one or more beams or panels to switch from the source BS to a target BS during a handover procedure, means for performing the handover procedure to switch from the source BS to the target BS with the first one or more beams or panels for communication with the target BS and the second one or more beams or panels for communication with the source BS, and/or the like. In some aspects, such means may include one or more components of UE 120 described in connection with FIG. 2.

In some aspects, BS 110 may include means for transmitting, to a user equipment (UE), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure, performing the handover procedure to switch the UE from the source BS to the target BS with the first one or more beams or panels for communication with the source BS and the second one or more beams or panels for communication with the target BS, receiving a trigger to perform a handover procedure for a user equipment (UE), communicating with the UE to perform a dual active protocol stack (DAPS) handover procedure or a concurrent connectivity handover procedure to switch the UE from a source BS to the target B S with a first one or more beams or panels for communication with the source BS and a second one or more beams or panels for communication with the target BS during the handover procedure, and/or the like. In some aspects, such means may include one or more components of BS 110 described in connection with FIG. 2.

As indicated above, FIG. 2 is provided as an example. Other examples may differ from what is described with regard to FIG. 2.

Figure 3A:
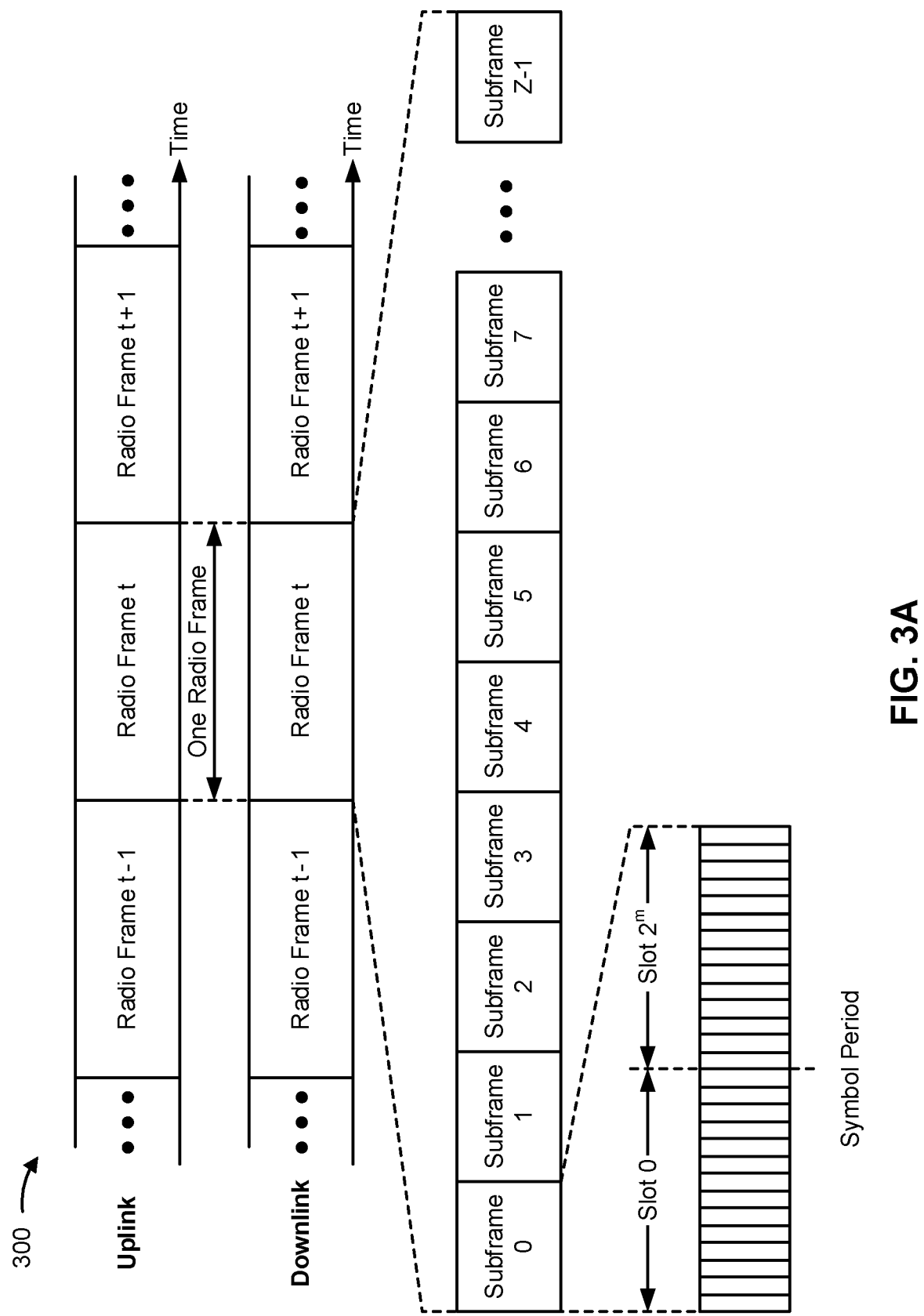
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
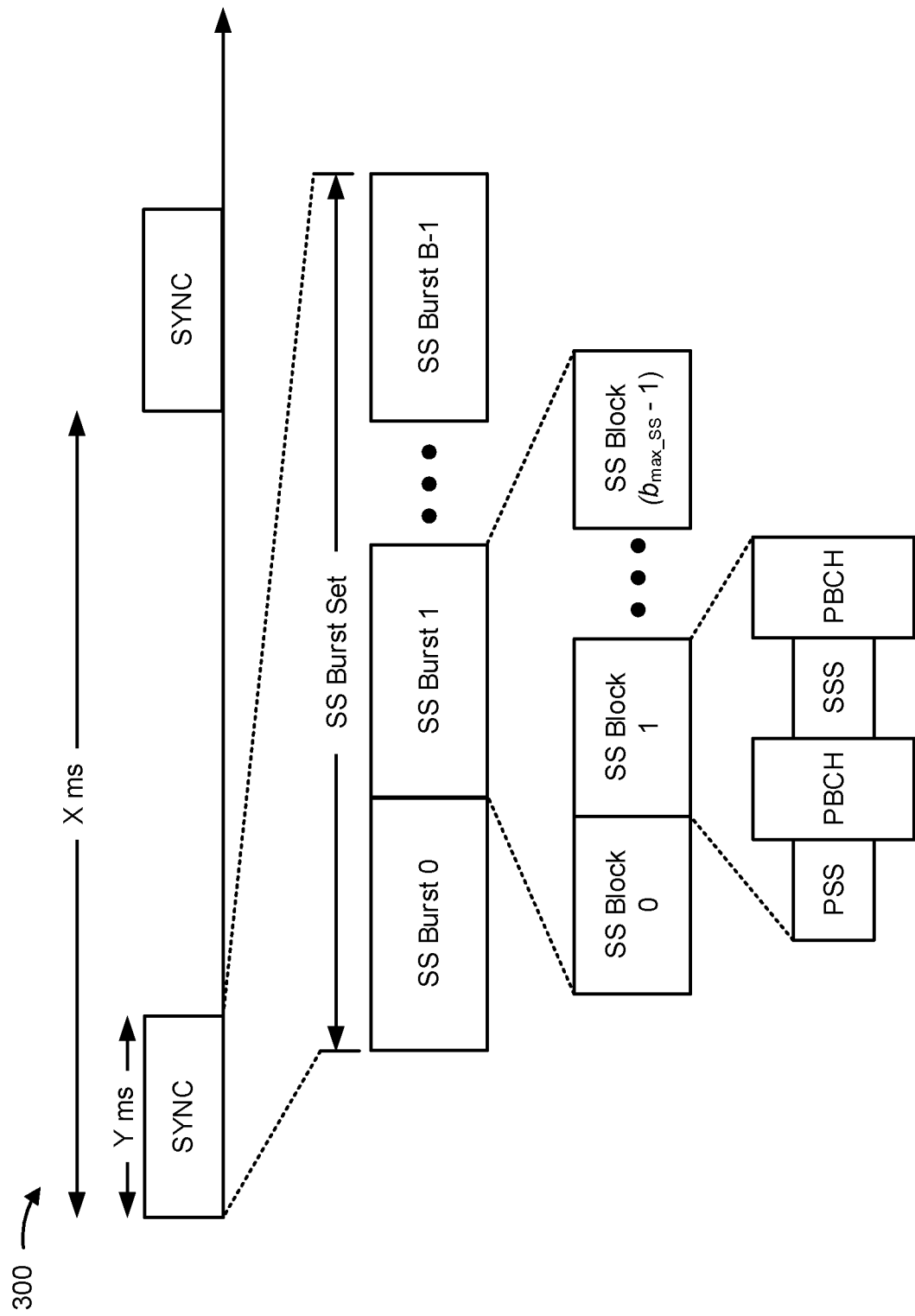
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
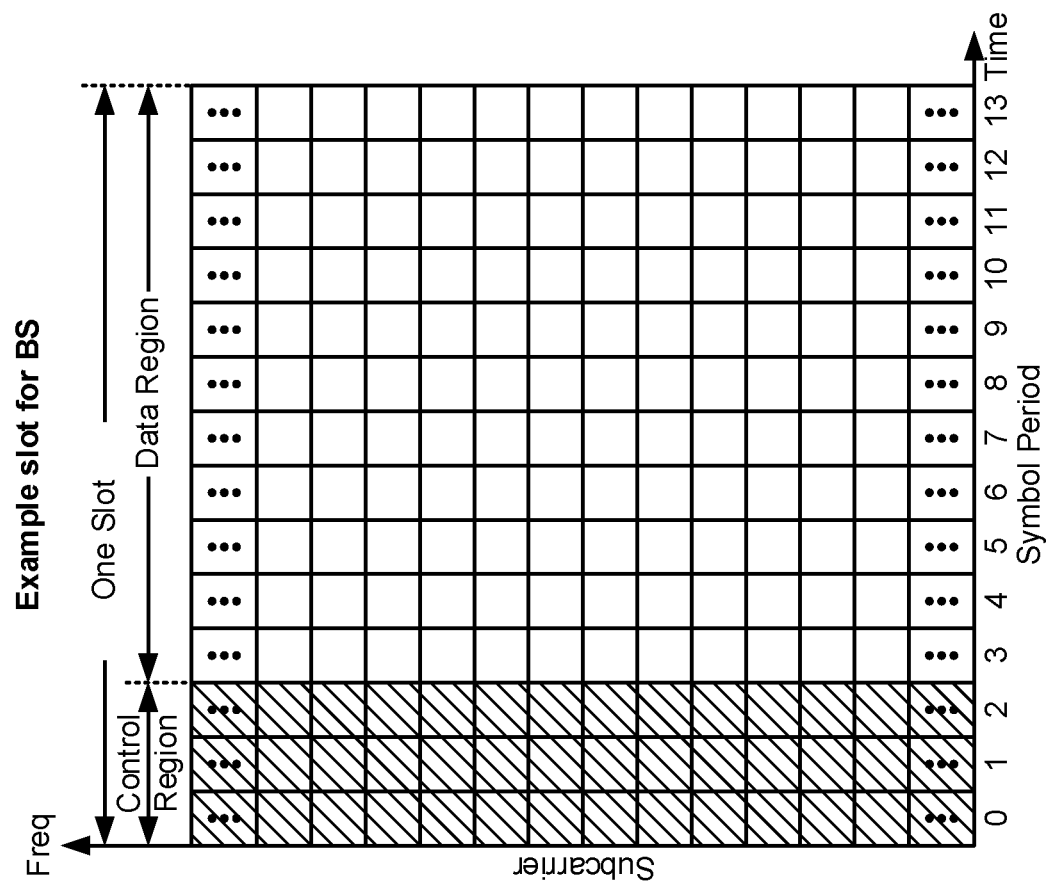
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include a dual active protocol stack (DAPS) service, which may also be termed a mobile broadband (MBB) or enhanced mobile broadband (eMBB) service, targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
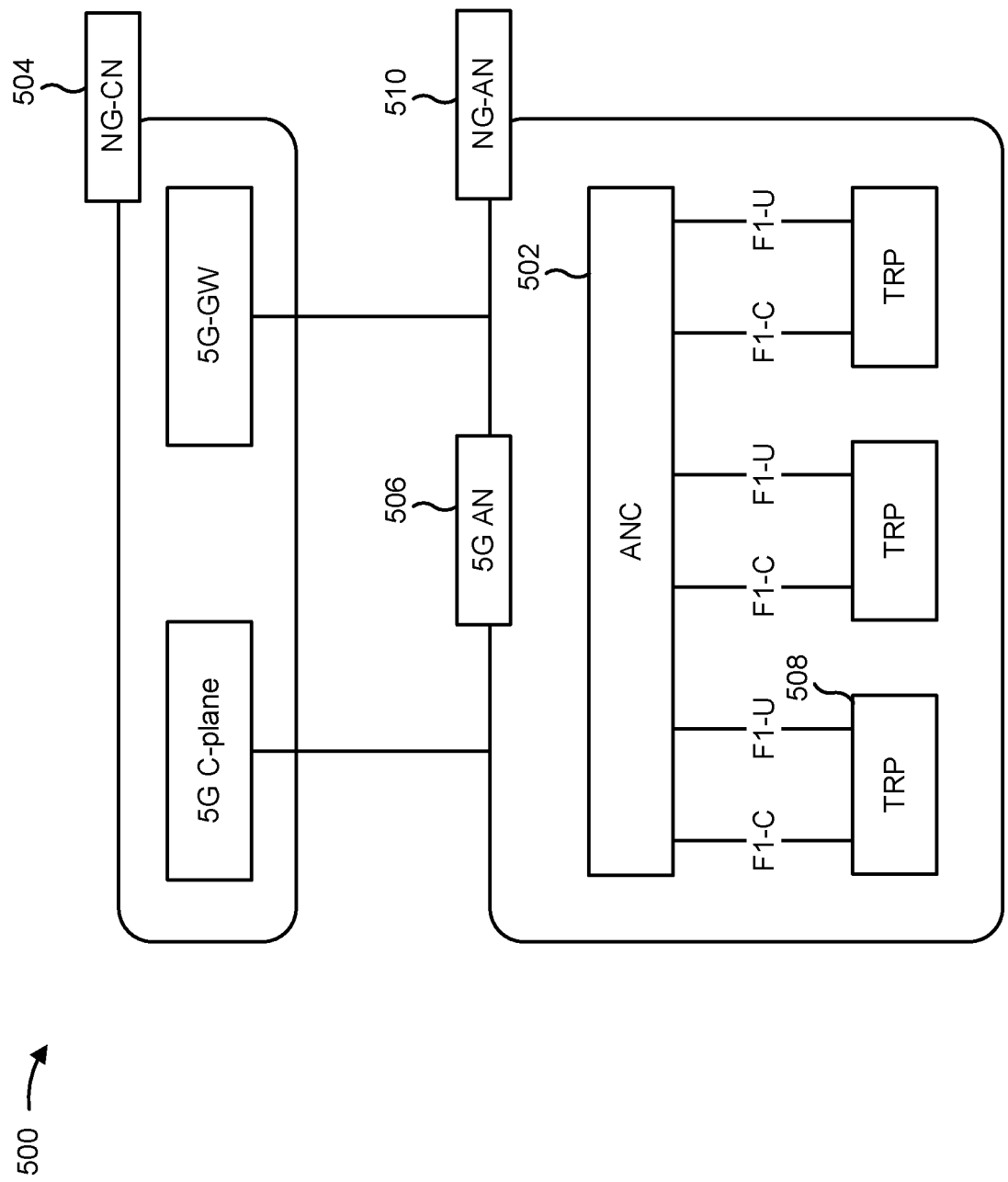
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
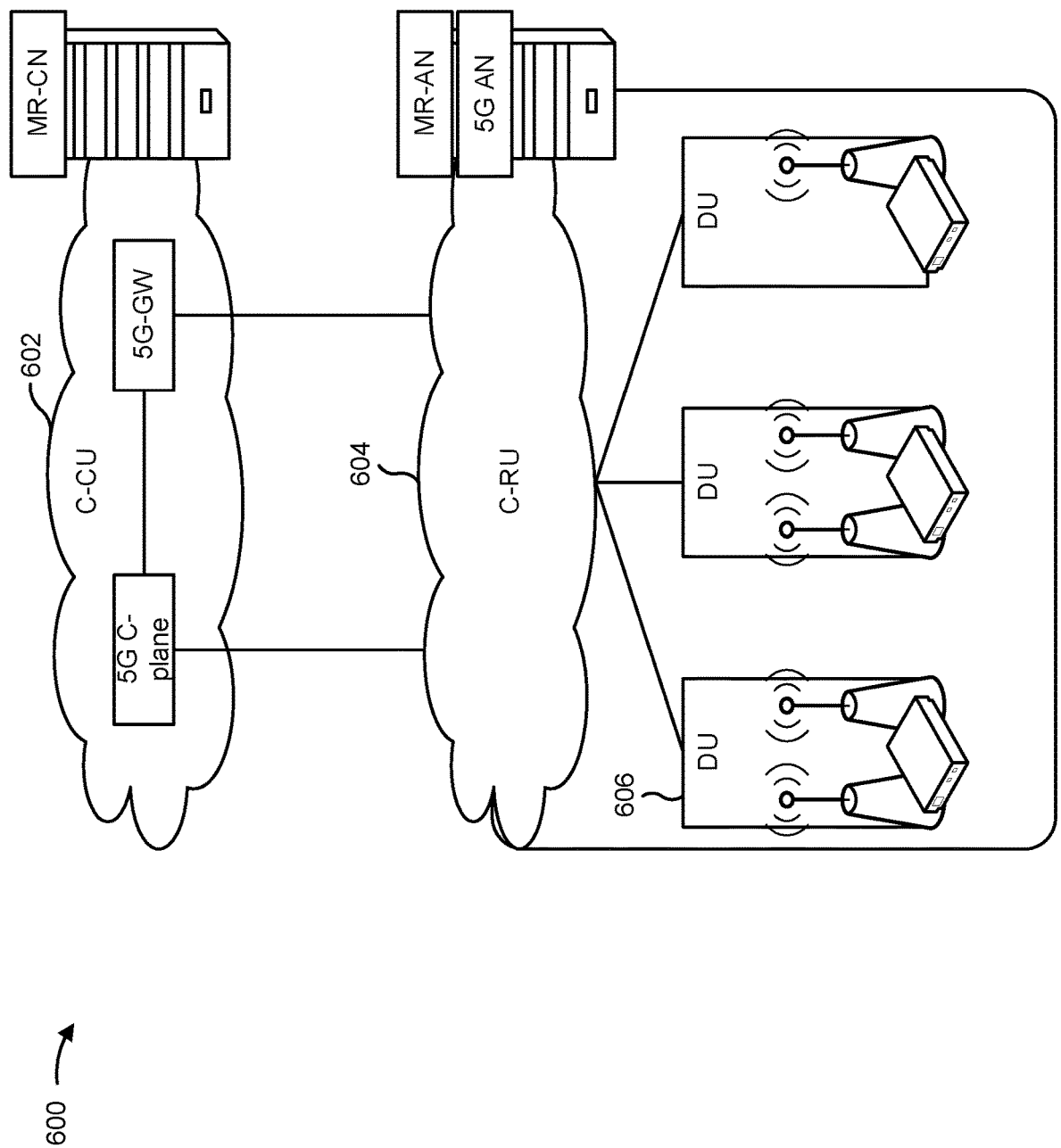
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some communications systems, such as NR, a UE may have a plurality of connectivity options. For example, the UE may be within a coverage area of a first BS and a second BS. Periodically, the UE may be instructed to hand over from the first BS to the second B S. For example, based at least in part on a measurement report, the first BS, which may be termed a source BS, may cause the UE to transfer to the second BS, which may be termed a target BS. However, handovers may be associated with an interruption to communication during a handover procedure.

Thus, a dual active protocol stack (DAPS) handover procedure may be used to reduce an interruption associated with the handover to less than several milliseconds (ms). During an DAPS handover procedure, the UE may use some available beams or panels to continue to communicate with the source BS and other beams or panels to hand over to and communicate with the target BS. However, when the source BS lacks information identifying a subset of beams or panels that are to be switched to the target BS, the source BS may continue to attempt to communicate with the UE using the subset of beams or panels. This may result in dropped communication, wasted power resources, and/or the like.

Some aspects described herein may enable a source BS to identify one or more beams or panels that are to be switched to the target BS when performing a random access channel-less (RACH-less) DAPS handover procedure, an DAPS handover procedure with slot aggregation, and/or the like. In this way, a likelihood of dropped communication, wasted power resources, and/or the like may be reduced. Moreover, based at least in part on enabling RACH-less handover and slot aggregation for DAPS handover procedures, the UE, the source BS, and the target BS may reduce a utilization of network resources, increase a reliability of communications associated with an DAPS handover procedure, and/or the like.

FIGS. 7-11 are diagrams illustrating examples 700-1100 of user equipment handovers, in accordance with various aspects of the present disclosure. As shown in FIGS. 7-11, examples 700-1100 may include a UE 120, a source BS 110, a target BS 110, and core networks 702-1102. In some aspects, core networks 702-1102 may be devices of a network, such as source BS 110, target BS 110, a network controller 130, a user plane function, and/or the like.

Figure 7:
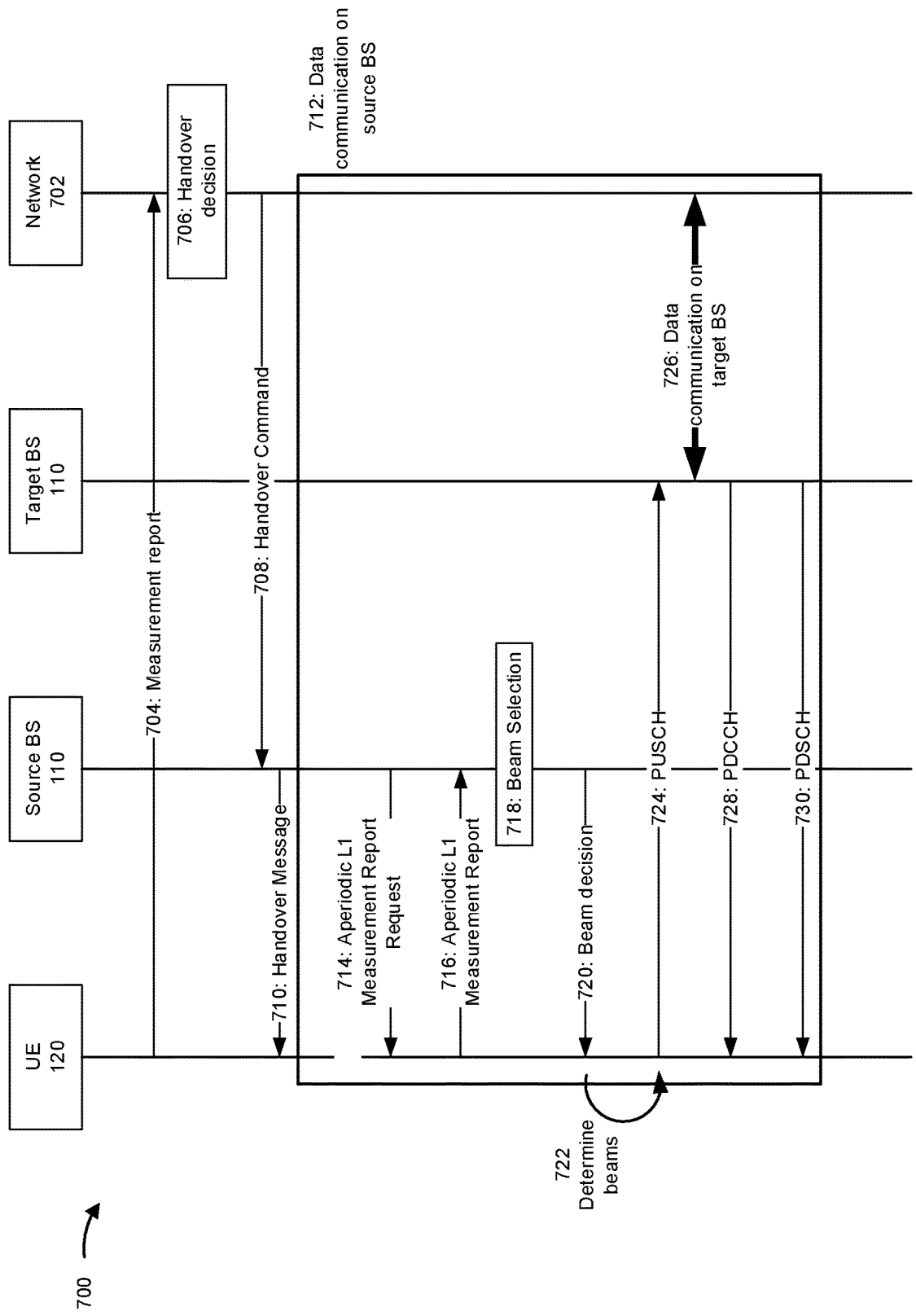
FIGS. 7-11 are diagrams illustrating examples of user equipment handovers, in accordance with various aspects of the present disclosure.

As shown in FIG. 7, example 700 is an example of a random access channel (RACH-less) handover (e.g., a handover without a random access procedure being performed). As shown by reference number 704, UE 120 may provide a measurement report to one or more devices of core network 702. For example, UE 120 may provide layer 3 (L3) measurements, which may be time-averaged over a threshold period of time, and/or layer 1 (L1) measurements, which may not be time-averaged over the threshold period of time. In some aspects, UE 120 may provide the measurement report to source BS 110, target BS 110, network controller 130, a user plane function, and/or the like.

As further shown in FIG. 7, and by reference number 706, based at least in part on receiving the measurement report, core network 702 (e.g., source BS 110, target BS 110, or another device) may determine to handover UE 120 from source BS 110 to target BS 110. In this case, core network 702 may determine to perform an DAPS handover procedure where UE 120 remains at least partially connected to source BS 110 while handing over to target BS 110. In some aspects, core network 702 may transmit a message to target BS 110 to indicate that a handover is to occur, and target BS 110. Additionally, or alternatively, target BS 110 may receive another trigger that the handover is to occur, such as a message from source BS 110, UE 120, and/or the like.

As further shown in FIG. 7, and by reference numbers 708 and 710, UE 120 may receive a handover message indicating that UE 120 is to handover from source BS 110 to target BS 110. For example, core network 702 may provide a handover command to source BS 110, which may convey the handover command to UE 120 via a radio resource control (RRC) reconfiguration message. In some aspects, the handover message may include an uplink grant. For example, source BS 110 may provide an uplink grant to UE 120 to enable UE 120 to communicate, on an uplink, with source BS 110 and/or target BS 110 during the RACH-less handover procedure. In some aspects, source BS 110 may provide beam and/or panel information in the handover message. For example, as described in more detail herein, source BS 110 may determine one or more beams and/or panels to remain with source BS 110 during the DAPS handover procedure and may include beam and/or panel information identifying the one or more beams and/or panels in the handover message.

In some aspects, source BS 110 may provide the handover message, which may trigger UE 120 to perform a set of L1 measurements and reporting of the set of L1 measurements to enable beam selection for the DAPS handover procedure. In some aspects, source BS 110 may provide an aperiodic L1 measurement request, as described in more detail herein, before providing the handover message and based at least in part on receiving a request from core network 702 to perform a handover for UE 120. In this case, source BS 110 may select one or more beams and/or panels to remain with source BS 110, and may provide the handover message identifying the one or more beams.

As further shown in FIG. 7, and by reference numbers 712, 714, and 716, while data communication (e.g., data transmission and data reception) is still occurring using source BS 110, source BS 110 may request another measurement report and UE 120 may provide a measurement report as a response. For example, UE 120 may request an aperiodic L1 measurement report and UE 120 may perform an L1 measurement and provide results of performing the L1 measurement to source BS 110. In some aspects, the data communication with the source BS 110 may continue during subsequent steps associated with connecting to the target BS 110.

As further shown in FIG. 7, and by reference numbers 718 and 720, based at least in part on the aperiodic L1 measurement report, source BS 110 may select and provide an indication of a first one or more beams and/or panels to remain with source BS 110 during the RACH-less handover and may select a second one or more beams and/or panels to switch to target BS 110 during the RACH-less handover. In this way, source BS 110 enables performance of an DAPS handover procedure. In some aspects, source BS 110 may determine the first one or more beams and/or panels (and/or the second one or more beams and/or panels) without receiving the aperiodic L1 measurement report. For example, source BS 110 may use the measurement report previously provided to core network 702 to extract beam information, which source BS 110 may use to determine the first one or more beams and/or panels.

In some aspects, source BS 110 may request that L1 measurements be performed for all panels of UE 120 associated with all beams of UE 120. Alternatively, source BS 110 may request that L1 measurements be performed for an identified subset of panels. In some aspects, source BS 110 may request that UE 120 report L1 measurements for all panels, for an identified subset of panels, for a subset of panels with a best set of L1 measurements, and/or the like. In some aspects, source BS 110 may select the one or more first beams and/or panels based at least in part on relative priorities of source BS 110 and target BS 110. For example, based at least in part on source BS 110 having a higher priority than target BS 110 and a connection between source BS 110 and UE 120 being relatively weak, source BS 110 may select beams with a best reference signal received power (RSRP) for source BS 110 to preserve a connection with source BS 110 during the DAPS handover. Alternatively, when target BS 110 has a higher priority and the connection is relatively strong, source BS 110 may select beams with a best RSRP for target BS 110 to enable the handover to increase a likelihood of handover success.

In some aspects, the beam and/or panel information may include a transmission control indicator (TCI) state, a quasi co-location (QCL) information parameter, a spatial relation, and/or the like determined based at least in part on an L1 measurement (e.g., of the L1 measurement report or of the measurement report provide to core network 702). In some aspects, source BS 110 may provide an explicit indicator of the first one or more beams (and/or the second one or more beams). For example, source BS 110 may provide beam identifiers and/or panel identifiers corresponding to beams and/or panels that UE 120 is to select. Additionally, or alternatively, source BS 110 may provide beam information identifying the TCI state, QCL information parameter, and/or the like to enable UE 120 to select the first one or more beams.

As further shown in FIG. 7, and by reference number 722, UE 120 may determine the first one or more beams to remain with source BS 110 and the second one or more beams to switch to target BS 110 based at least in part on the indication received from source BS 110. For example, UE 120 may determine the first one or more beams and/or panels based at least in part on an explicit indicator, based at least in part on beam information, and/or the like.

As further shown in FIG. 7, and by reference numbers 724, 726, 728, and 730, UE 120 and target BS 110 may communicate to perform the RACH-less handover and may begin communicating data traffic using target BS 110. For example, UE 120 may transmit a physical uplink shared channel (PUSCH) to target BS 110 using the second one or more beams and may receive a physical downlink control channel (PDCCH) and/or a physical downlink shared channel (PDSCH) from target BS 110 using the second one or more beams. In this case, based at least in part on transmitting the PUSCH and receiving the PDCCH and/or PDSCH, UE 120 may hand over to target BS 110 and may switch the first one or more beams from source BS 110 to target BS 110 based at least in part on having handed over to target BS 110. In some aspects, UE 120 and source BS 110 may release a connection between UE 120 and source BS 110 to complete the RACH-less handover.

Figure 8:
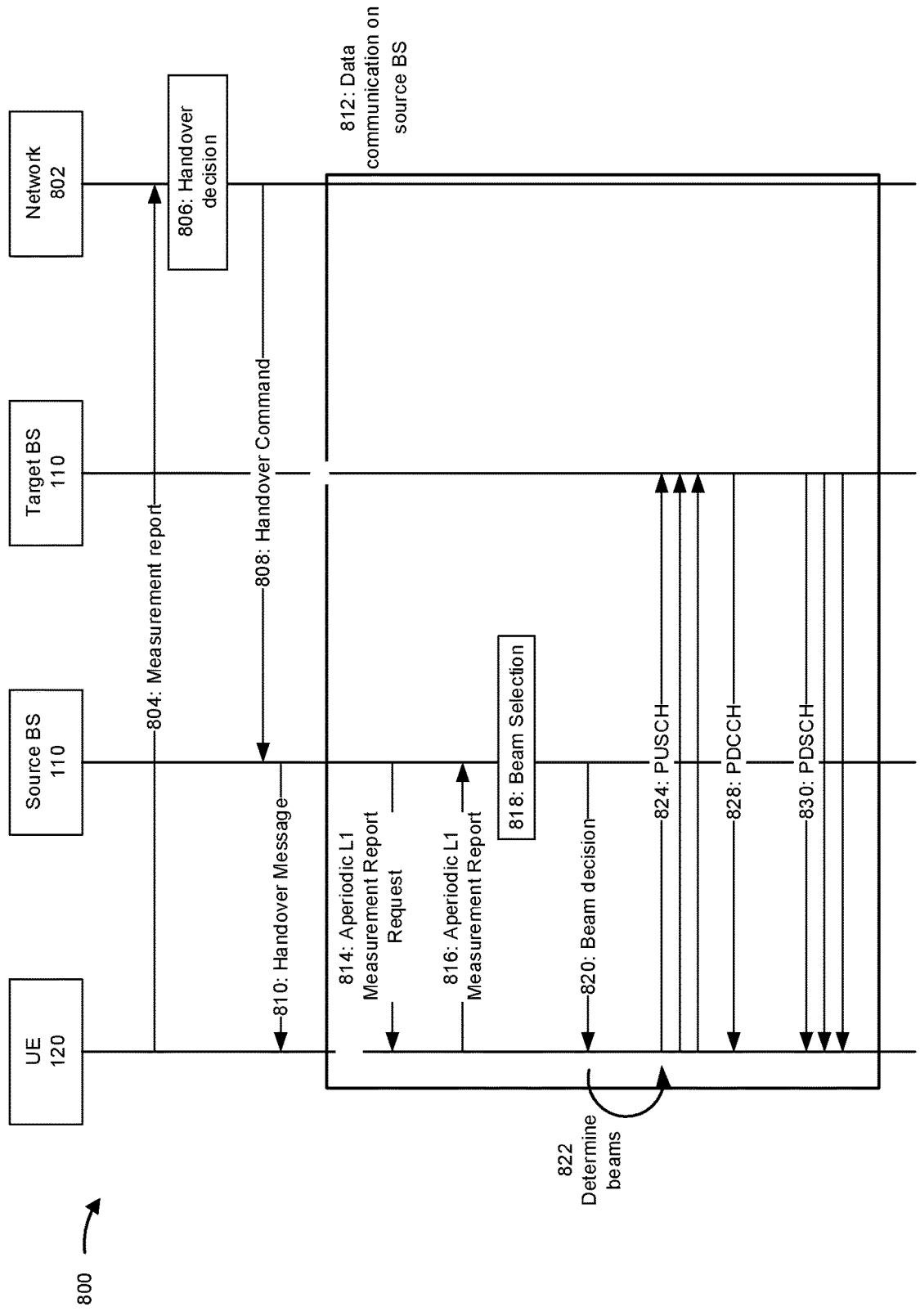

FIG. 8 shows an example of an DAPS handover procedure with slot aggregation enabled. For example, as shown by reference numbers 804-822, source BS 110 and UE 120 communicate to select a first set of beams and/or panels to remain with source BS 110 and a second set of beams and/or panels to switch to target BS 110. In some aspects, source BS 110 may transmit information, such as during a RACH procedure, when indicating a beam selection, and/or the like, indicating that slot aggregation is to be enabled for PUSCH transmission to target BS 110. For example, source BS 110 may include an indicator that slot aggregation is to be enabled with an uplink grant that source BS 110 provides to UE 120. In some aspects, source BS 110 may indicate aggregation information, such as whether UE 120 is to use a same transmission beam for each PUSCH transmission or a plurality of different transmission beams for the plurality of PUSCH transmissions. Additionally, or alternatively, target BS 110 may provide a message to UE 120 to indicate one or more parameters for slot aggregation.

In this case, as further shown in FIG. 8, and by reference number 824, UE 120 may transmit a plurality of copies of a PUSCH in a plurality of slots using slot aggregation. For example, UE 120 may transmit the plurality of copies of the PUSCH to target BS 110 using a single transmission beam, a plurality of transmission beams, and/or the like. As shown by reference number 828, when switching data communication to target BS 110, target BS 110 may transmit a PDCCH including beam information to UE 120. For example, target BS 110 may indicate that slot aggregation is to be enabled for a subsequent PDSCH transmission, a quantity of slots that are to be aggregated, whether to use a same beam or different beams for slot aggregation, and/or the like. As shown by reference number 830, target BS 110 may transmit a plurality of copies of the PDSCH to UE 120 using slot aggregation. For example, UE 120 may receive the plurality of copies using a single beam and/or panel, a plurality of beams and/or panels, and/or the like based at least in part on beam and/or panel information included in the PDCCH.

Figure 9:
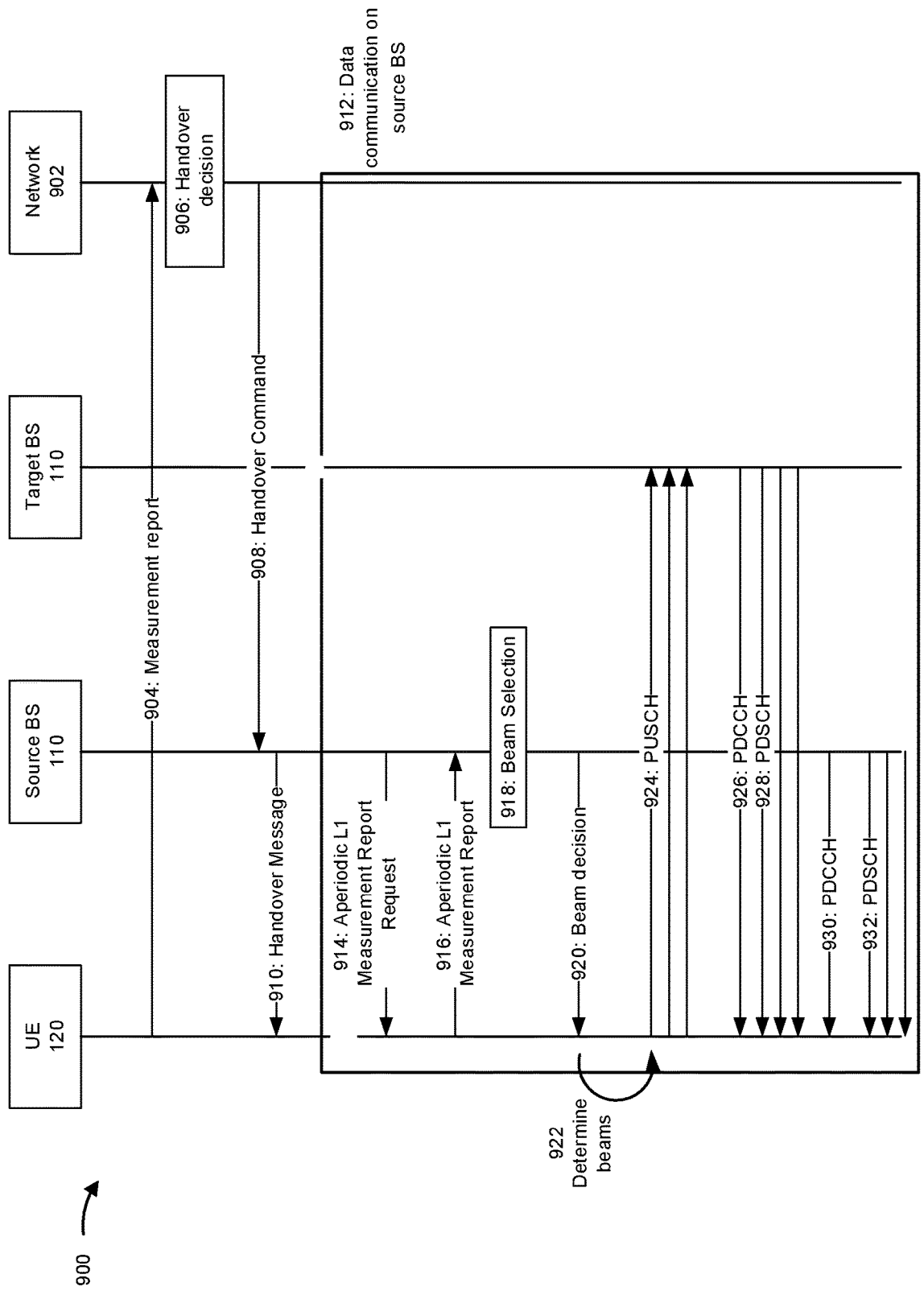

FIG. 9 shows an example of an DAPS handover procedure with slot aggregation enabled for both source BS 110 and target BS 110. In this case, as shown by reference numbers 904-922, source BS 110 and UE 120 communicate to select a first set of beams to remain with source BS 110 and a second set of beams to switch to target BS 110. As shown by reference number 924, UE 120 may transmit a plurality of copies of a PUSCH to target BS 110 using slot aggregation. As shown by reference number 926, UE 120 may receive PDCCHs from source BS 110 and target BS 110 indicating that slot aggregation is enabled across BSs 110.

Additionally, or alternatively, the PDCCHs may include aggregation information indicating a quantity of slots to be aggregated for each BS 110, whether to use a same beam or different beams for each BS 110, and/or the like. In some aspects, one or more of the PDCCHs may include aggregation information identifying a threshold time period for reception of a set of PDSCHs corresponding to the one or more PDCCHs. In some aspects, at least a portion of the aggregation information may be received by UE 120 via a previous handover message from source BS 110, thereby reducing a signaling overhead of the one or more PDCCHs. Additionally, or alternatively, some of the aggregation information may be in a first PDCCH and some of the aggregation information may be in a second PDCCH transmitted by source BS 110, thereby avoiding duplication of the aggregation information and reducing signaling overhead associated with the one or more PDCCHs.

As further shown in FIG. 9, and by reference number 928, UE 120 may receive a plurality of copies of a PDSCH from target BS 110 using slot aggregation. Similarly, as shown by reference numbers 930 and 932, UE 120 may receive a PDCCH indicating that source BS 110 is using slot aggregation and a plurality of copies of a PDSCH using slot aggregation. In some aspects, UE 120 may receive a PDCCH from target BS 110, one or more PDSCHs from target BS 110, a PDCCH from source BS 110, and one or more PDSCHs from source BS 110 in sequence, as shown. Alternatively, UE 120 may receive PDCCHs from source BS 110 and target BS 110 followed by PDSCHs from source BS 110 and target BS 110. Although described herein in terms of a particular sequence of transmissions, other sequences are possible. Additionally, or alternatively, concurrent transmission and/or reception of one or more transmissions described herein may be possible. In some aspects, UE 120 may receive each PDSCH within a threshold time period of each other. In this way, UE 120 may be enabled to aggregate data of each PDSCH.

Figure 10:
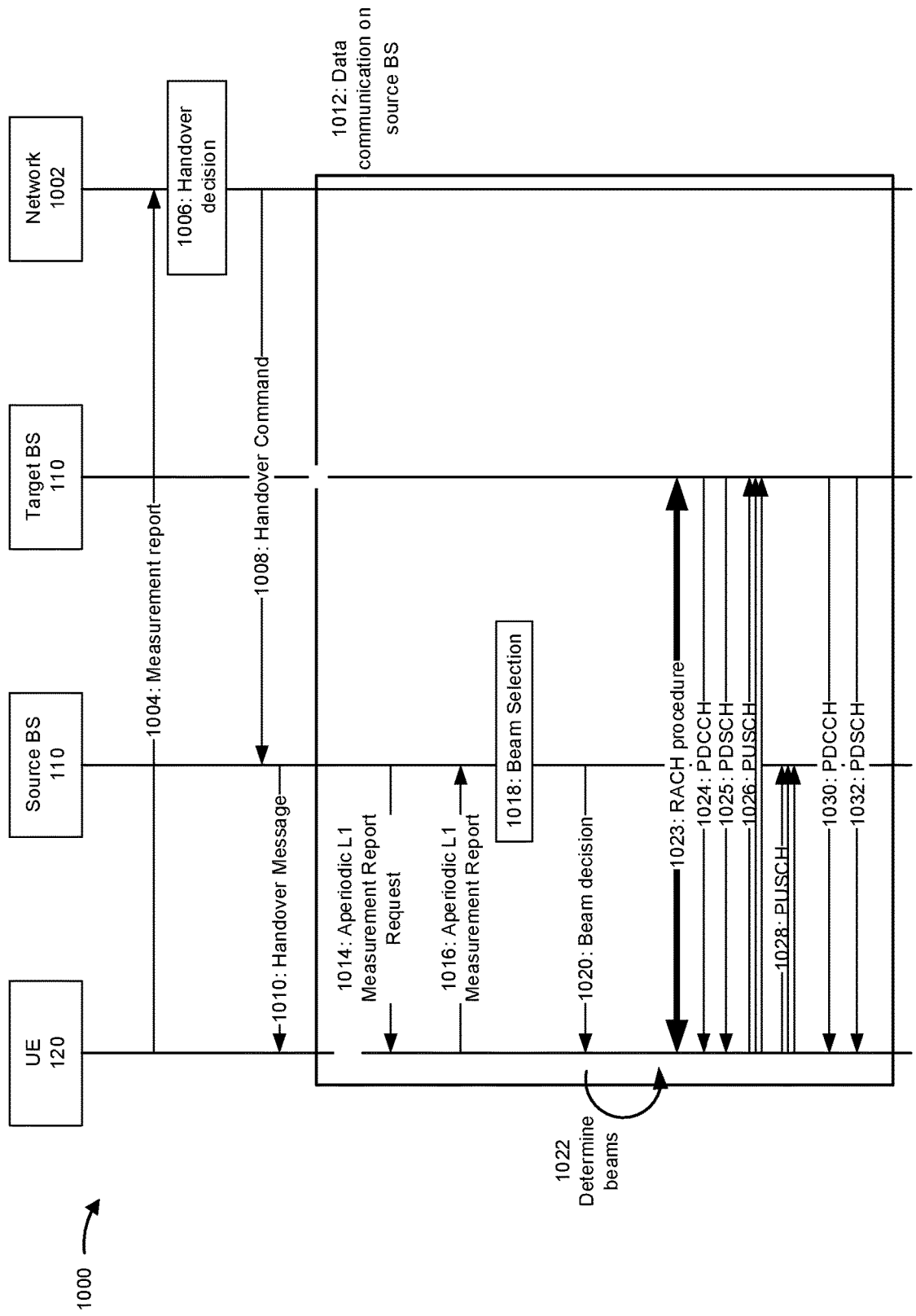

FIG. 10 is an example of an DAPS handover procedure with uplink slot aggregation. In this case, as shown by reference numbers 1004-1022, source BS 110 and UE 120 communicate to select a first set of beams to remain with source BS 110 and a second set of beams to switch to target BS 110. As shown by reference number 1023, UE 120 may perform a RACH procedure with target BS 110 to transfer to target BS 110. As shown by reference numbers 1024 and 1025, UE 120 may receive a PDCCH including another uplink grant in addition to an uplink grant received in connection with a handover message, and may receive a PDSCH after the RACH procedure. In this case, at least one of the uplink grants may include aggregation information indicating that slot aggregation is enabled for uplink transmissions, a quantity of slots to use for aggregation, whether to use aggregation for a single BS 110 or a plurality of BSs 110, whether to use a same or different beams for slot aggregation, a maximum time offset for transmissions using slot aggregation, and/or the like.

As further shown in FIG. 10, and by reference numbers 1026 and 1028, UE 120 may transmit a plurality of copies of a PUSCH to target BS 110 and/or source BS 110 using uplink slot aggregation. In this case, both source BS 110 and target BS 110 may provide data of the plurality of copies of the PUSCH to core network 1002 for aggregation. In some aspects, UE 120 may transmit the plurality of copies of the PUSCH sequentially, concurrently, and/or the like. As shown by reference numbers 1030 and 1032, UE 120 may receive a PDCCH and/or a PDSCH from target BS 110 after transmitting the plurality of copies of the PUSCH.

Figure 11:
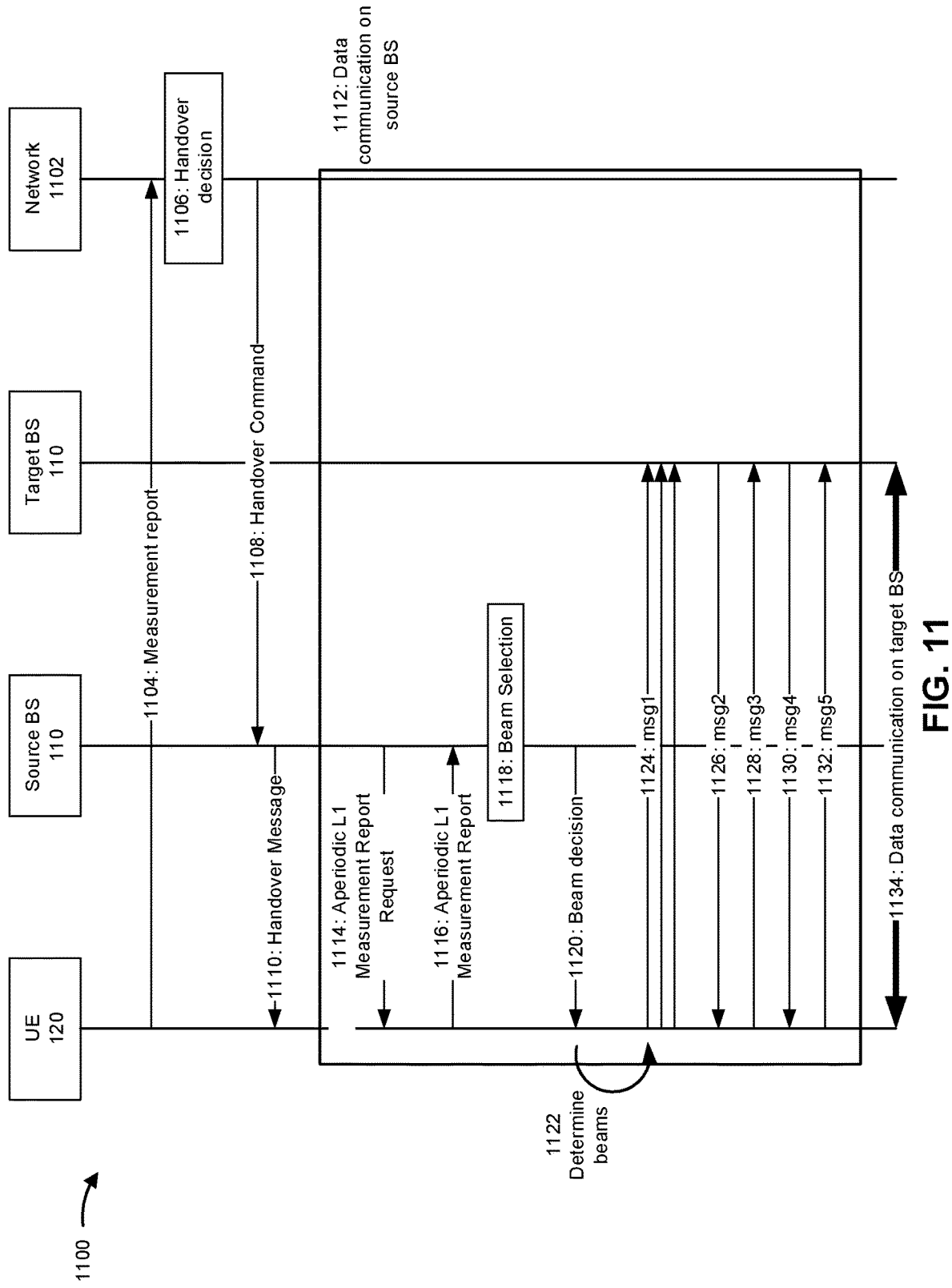

FIG. 11 is an example of an DAPS handover procedure with slot aggregation for a RACH procedure. In this case, as shown by reference numbers 1104-1122, source BS 110 and UE 120 communicate to select a first set of beams to remain with source BS 110 and a second set of beams to switch to target BS 110. As shown by reference numbers 1124-1132, UE 120 and target BS 110 may exchange one or more RACH messages of a RACH procedure using slot aggregation. For example, UE 120 may transmit a plurality of copies of a RACH message 1 (msg 1) using slot aggregation to improve a reliability of RACH signaling to perform an DAPS handover procedure. Additionally, or alternatively, UE 120 may transmit and/or receive one or more other RACH messages using slot aggregation. As shown by reference number 1134, after the RACH procedure, UE 120 and target BS 110 may communicate data (e.g., UE 120 may transmit data to and/or receive data from target BS 110 based at least in part on having handed over to target BS 110 using the RACH procedure).

As indicated above, FIGS. 7-11 are provided examples. Other examples may differ from what is described with respect to FIGS. 7-11.

Figure 12:
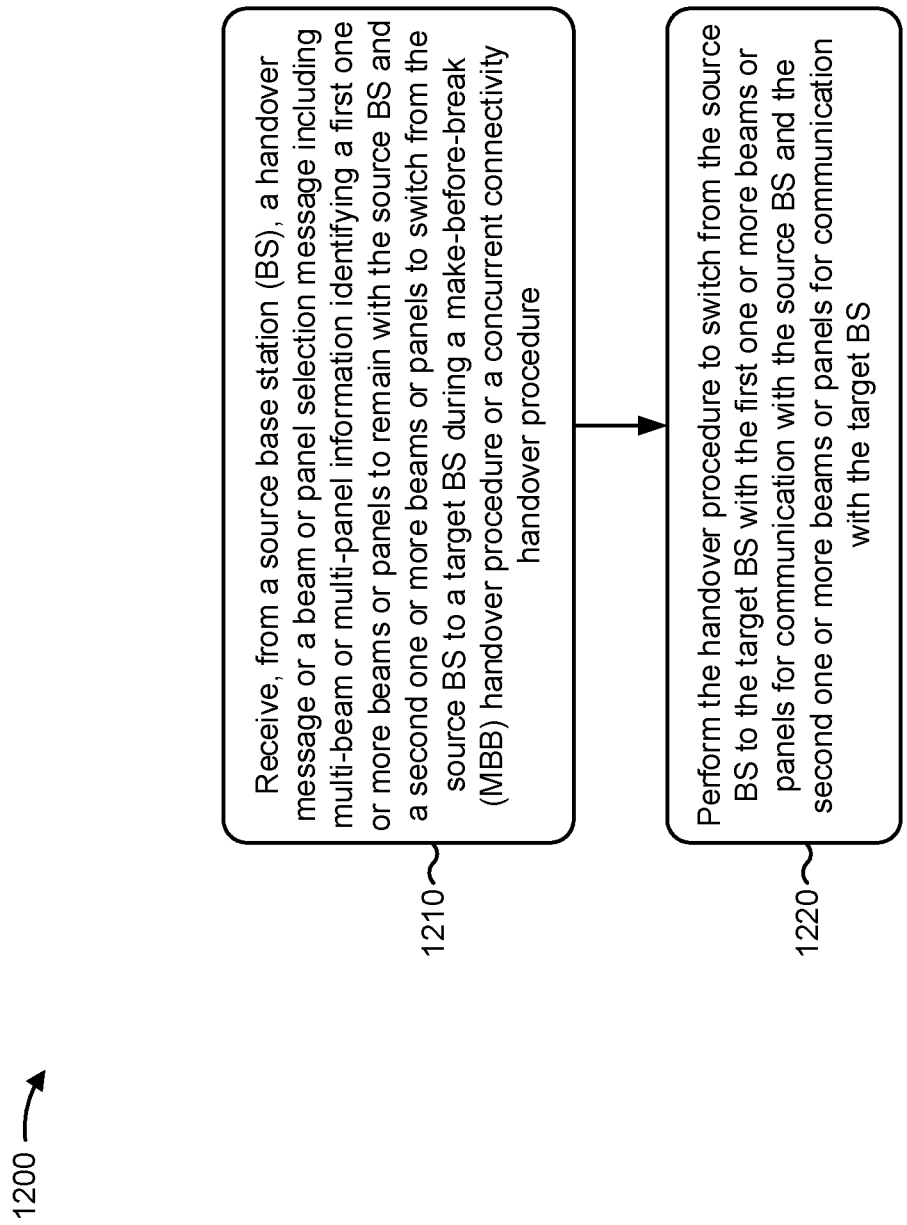
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where a UE (e.g., UE 120 and/or the like) performs operations associated with user equipment handover.

As shown in FIG. 12, in some aspects, process 1200 may include receiving, from a source base station (BS), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure (block 1210). For example, the UE (e.g., using receive processor 258, transmit processor 264, controller/processor 280, memory 282, and/or the like) may receive, from a source base station (BS), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure, as described above.

As further shown in FIG. 12, in some aspects, process 1200 may include performing the handover procedure to switch from the source BS to the target BS with the first one or more beams or panels for communication with the source BS and the second one or more beams or panels for communication with the target BS (block 1220). For example, the UE (e.g., using receive processor 258, transmit processor 264, controller/processor 280, memory 282, and/or the like) may perform the handover procedure to switch from the source BS to the target BS with the first one or more beams or panels for communication with the source BS and the second one or more beams or panels for communication with the target BS, as described above.

Process 1200 may include additional aspects, such as any single aspect or any combination of aspects described below and/or in connection with one or more other processes described elsewhere herein.

In a first aspect, the handover message or the beam or panel selection message is at least one of a handover command, a beam selection message, or a random access channel message.

In a second aspect, alone or in combination with the first aspect, the handover procedure is a random access channel-less (RACH-less) handover procedure.

In a third aspect, alone or in combination with any one or more of the first and second aspects, the UE is configured to use the multi-beam or multi-panel information for a physical uplink shared channel (PUSCH) transmission to the target BS.

In a fourth aspect, alone or in combination with any one or more of the first through third aspects, process 1200 includes transmitting a measurement report including information identifying at least one of: a layer 3 (L3) measurement or a layer 1 (L1) measurement; and receiving the handover message or the beam or panel selection message includes receiving the handover message or the beam or panel selection message based at least in part on transmitting the measurement report.

In a fifth aspect, alone or in combination with any one or more of the first through fourth aspects, the handover message or the beam or panel selection message includes beam information identifying a least one of a transmission configuration indicator (TCI) state, a quasi co-location (QCL) information parameter, or a spatial relation, and the UE is configured to determine the first one or more beams or panels and the second one or more beams or panels based at least in part on the beam information.

In a sixth aspect, alone or in combination with any one or more of the first through fifth aspects, process 1200 may include receiving a request for an aperiodic layer 1 (L1) measurement report and transmitting the aperiodic L1 measurement report; and receiving the handover message or the beam or panel selection message may include receiving the handover message or the beam or panel selection message based at least in part on transmitting the aperiodic L1 measurement report.

In a seventh aspect, alone or in combination with any one or more of the first through sixth aspects, the handover message or the beam or panel selection message includes information explicitly indicating the first one or more beams or panels or the second one or more beams or panels.

In an eighth aspect, alone or in combination with any one or more of the first through seventh aspects, the first one or more beams or panels or the second one or more beams or panels are determined based at least in part on at least one of a prioritization of the source BS or a prioritization of the target BS.

In a ninth aspect, alone or in combination with any one or more of the first through eighth aspects, process 1200 may include receiving slot aggregation information scheduling data in a plurality of slots, and communicating at least one signal of the handover procedure using slot aggregation for the data in the plurality of slots.

In a tenth aspect, alone or in combination with the ninth aspect, the slot aggregation information is included with an uplink grant in the handover message or the beam or panel selection message.

In an eleventh aspect, alone or in combination with any one or more of the ninth through tenth aspects, the slot aggregation information is included in a physical downlink control channel (PDCCH) received after a random access channel (RACH) procedure of the handover procedure.

In a twelfth aspect, alone or in combination with any one or more of the ninth through eleventh aspects, the slot aggregation information includes information identifying at least one of a slot aggregation indicator, the at least one signal, a multi-beam or multi-panel parameter, a quantity of slots to be aggregated, an aggregation type, a time window for reception of physical downlink shared channels, or a slot identifier.

In a thirteenth aspect, alone or in combination with any one or more of the ninth through twelfth aspects, communicating the at least one signal includes transmitting a plurality of copies of a physical uplink shared channel.

In a fourteenth aspect, alone or in combination with any one or more of the ninth through thirteenth aspects, communicating the at least one signal includes receiving a plurality of copies of a physical downlink shared channel.

In a fifteenth aspect, alone or in combination with any one or more of the ninth through fourteenth aspects, communicating the at least one signal includes transmitting data in the at least one signal to the source BS and the target BS.

In a sixteenth aspect, alone or in combination with any one or more of the ninth through fifteenth aspects, at least a portion of the slot aggregation information is included in the handover message or the beam or panel selection message.

In a seventeenth aspect, alone or in combination with any one or more of the ninth through sixteenth aspects, process 1200 includes receiving an uplink grant in a signal separate from the handover message or the beam or panel selection message; and communicating the at least one signal includes communicating the at least one signal using the uplink grant.

In an eighteenth aspect, alone or in combination with any one or more of the ninth through seventeenth aspects, the uplink grant includes at least a portion of the slot aggregation information.

In a nineteenth aspect, alone or in combination with any one or more of the ninth through eighteenth aspects, communicating the at least one signal includes communicating a plurality of communications of the at least one signal concurrently or sequentially.

In a twentieth aspect, alone or in combination with any one or more of the ninth through nineteenth aspects, the slot aggregation is uplink slot aggregation and the source BS and the target BS are each configured to receive the at least one signal using slot aggregation.

In a twenty-first aspect, alone or in combination with any one or more of the ninth through twentieth aspects, communicating that at least one signal includes communicating a random access channel (RACH) message using a plurality of slots.

In a twenty-second aspect, alone or in combination with any one or more of the ninth through twenty-first aspects, at least a portion of the slot aggregation information is received via a downlink RACH message.

In a twenty-third aspect, alone or in combination with any one or more of the ninth through twenty-second aspects, the first one or more beams or panels is determined based at least in part on one or more measurements, and the one or more measurements are UE-triggered measurements.

In a twenty-fourth aspect, alone or in combination with any one or more of the ninth through twenty-third aspects, the first one or more beams or panels is determined based at least in part on one or more measurements, and the one or more measurements are BS-triggered measurements.

In a twenty-fifth aspect, alone or in combination with any one or more of the ninth through twenty-fourth aspects, the first one or more beams or panels is determined based at least in part on one or more measurements, and the one or more measurements are performed before a handover decision associated with the handover procedure In a twenty-sixth aspect, alone or in combination with any one or more of the ninth through twenty-fifth aspects, the first one or more beams or panels is determined based at least in part on one or more measurements, and the one or more measurements are performed after a handover decision associated with the handover procedure.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
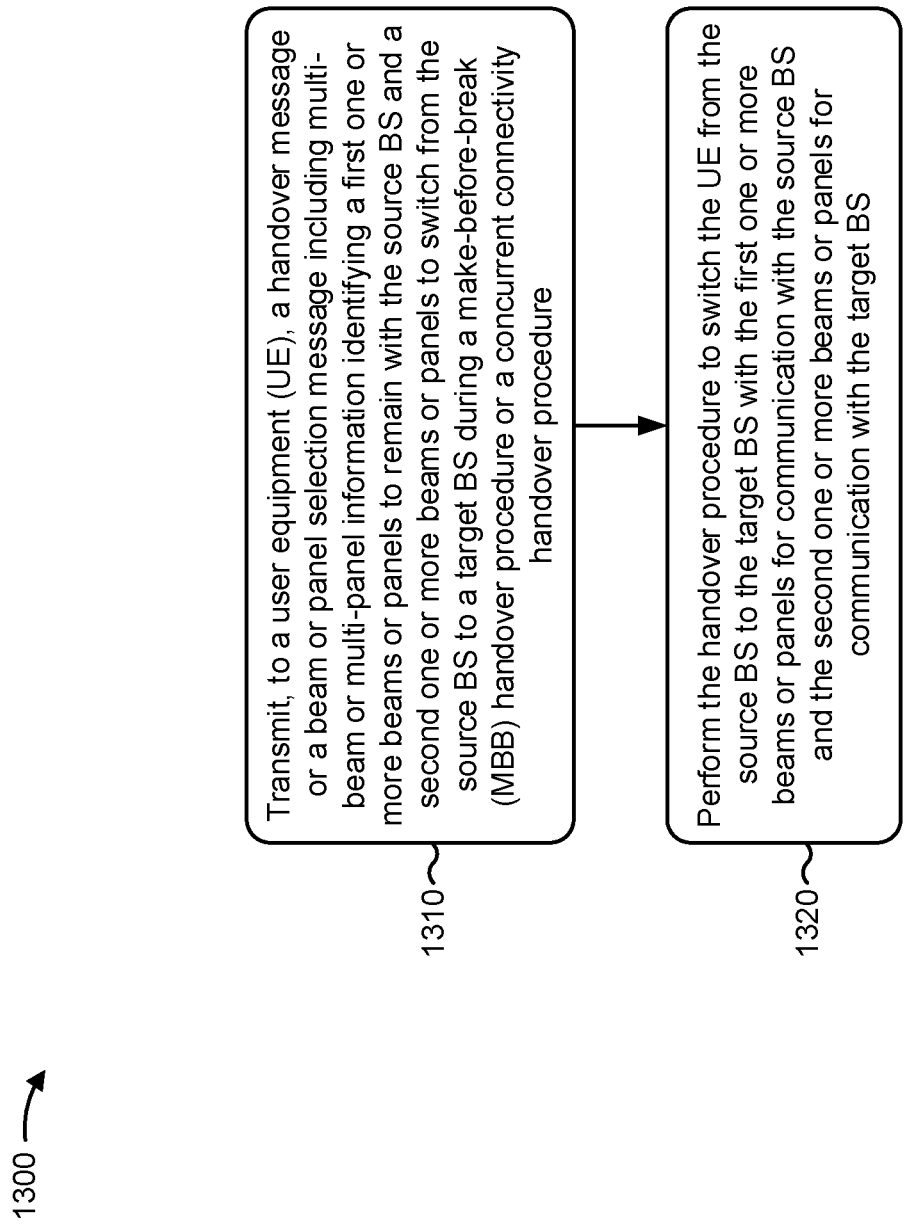
FIG. 13 is a diagram illustrating an example process performed, for example, by a source base station, in accordance with various aspects of the present disclosure.

FIG. 13 is a diagram illustrating an example process 1300 performed, for example, by a BS, in accordance with various aspects of the present disclosure. Example process 1300 is an example where a source BS (e.g., BS 110 and/or the like) performs operations associated with UE handovers.

As shown in FIG. 13, in some aspects, process 1300 may include transmitting, to a user equipment (UE), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure (block 1310). For example, the source BS (e.g., using transmit processor 220, receive processor 238, controller/processor 240, memory 242, and/or the like) may transmit, to a user equipment (UE), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure, as described above.

As further shown in FIG. 13, in some aspects, process 1300 may include performing the handover procedure to switch the UE from the source BS to the target BS with the first one or more beams or panels for communication with the source BS and the second one or more beams or panels for communication with the target BS (block 1320). For example, the source BS (e.g., using transmit processor 220, receive processor 238, controller/processor 240, memory 242, and/or the like) may perform the handover procedure to switch the UE from the source BS to the target BS with the first one or more beams or panels for communication with the source BS and the second one or more beams or panels for communication with the target BS, as described above.

Process 1300 may include additional aspects, such as any single implementation or any combination of aspects described below and/or in connection with one or more other processes described elsewhere herein.

In a first aspect, the handover message or the beam or panel selection message is at least one of a handover command, a beam selection message, or a random access channel message.

In a second aspect, alone or in combination with the first aspect, the handover procedure is a random access channel-less (RACH-less) handover procedure.

In a third aspect, alone or in combination with any one or more of the first through second aspects, the UE is configured to use the multi-beam or multi-panel information for a physical uplink shared channel (PUSCH) transmission to the target BS.

In a fourth aspect, alone or in combination with any one or more of the first through third aspects, process 1300 includes receiving a measurement report including information identifying at least one of a layer 3 (L3) measurement or a layer 1 (L1) measurement, and transmitting the handover message or the beam or panel selection message includes transmitting the handover message or the beam or panel selection message based at least in part on receiving the measurement report.

In a fifth aspect, alone or in combination with any one or more of the first through fourth aspects, the handover message or the beam or panel selection message includes beam information identifying a least one of a transmission configuration indicator (TCI) state, a quasi co-location (QCL) information parameter, or a spatial relation.

In a sixth aspect, alone or in combination with any one or more of the first through fifth aspects, process 1300 includes transmitting a request for an aperiodic layer 1 (L1) measurement report, and transmitting the handover message or the beam or panel selection message based at least in part on receiving the aperiodic L1 measurement report.

In a seventh aspect, alone or in combination with any one or more of the first through sixth aspects, the handover message or the beam or panel selection message includes information explicitly indicating the first one or more beams or panels or the second one or more beams or panels.

In an eighth aspect, alone or in combination with any one or more of the first through seventh aspects, the first one or more beams or panels or the second one or more beams or panels are determined based at least in part on at least one of: a prioritization of the source BS or a prioritization of the target BS.

In a ninth aspect, alone or in combination with any one or more of the first through eighth aspects, process 1300 includes transmitting slot aggregation information scheduling data in a plurality of slots, and communicating at least one signal of the handover procedure using slot aggregation for the data in the plurality of slots.

In a tenth aspect, alone or in combination with any one or more of the first through ninth aspects, the slot aggregation information is included with an uplink grant in the handover message or the beam or panel selection message.

In an eleventh aspect, alone or in combination with any one or more of the first through twelfth aspects, the slot aggregation information is included in a physical downlink control channel (PDCCH) received after a random access channel (RACH) procedure of the handover procedure.

In a twelfth aspect, alone or in combination with any one or more of the first through eleventh aspects, the slot aggregation information includes information identifying at least one of: a slot aggregation indicator, the at least one signal, a multi-beam or multi-panel parameter, a quantity of slots to be aggregated, an aggregation type, a time window for reception of physical downlink shared channels, or a slot identifier.

In a thirteenth aspect, alone or in combination with any one or more of the first through twelfth aspects, communicating the at least one signal includes receiving a plurality of copies of a physical uplink shared channel.

In a fourteenth aspect, alone or in combination with any one or more of the first through thirteenth aspects, communicating the at least one signal includes transmitting a plurality of copies of a physical downlink shared channel.

In a fifteenth aspect, alone or in combination with any one or more of the first through fourteenth aspects, communicating the at least one signal includes receiving data in the at least one signal that is also transmitted to the target BS.

In a sixteenth aspect, alone or in combination with any one or more of the first through fifteenth aspects, at least a portion of the slot aggregation information is included in the handover message or the beam or panel selection message.

In a seventeenth aspect, alone or in combination with any one or more of the first through sixteenth aspects, process 1300 includes transmitting an uplink grant in a signal separate from the handover message or the beam or panel selection message.

In an eighteenth aspect, alone or in combination with any one or more of the first through seventeenth aspects, the uplink grant includes at least a portion of the slot aggregation information.

In a nineteenth aspect, alone or in combination with any one or more of the first through eighteenth aspects, communicating the at least one signal includes communicating a plurality of communications of the at least one signal concurrently or sequentially.

In a twentieth aspect, alone or in combination with any one or more of the first through nineteenth aspects, the slot aggregation is uplink slot aggregation.

In a twenty-first aspect, alone or in combination with any one or more of the first through twentieth aspects, the first one or more beams or panels is determined based at least in part on one or more measurements, and the one or more measurements are UE-triggered measurements.

In a twenty-second aspect, alone or in combination with any one or more of the first through twenty-first aspects, the first one or more beams or panels is determined based at least in part on one or more measurements, and the one or more measurements are BS-triggered measurements.

In a twenty-third aspect, alone or in combination with any one or more of the first through twenty-second aspects, the first one or more beams or panels is determined based at least in part on one or more measurements, and the one or more measurements are performed before a handover decision associated with the handover procedure.

In a twenty-fourth aspect, alone or in combination with any one or more of the first through twenty-third aspects, the first one or more beams or panels is determined based at least in part on one or more measurements, and the one or more measurements are performed after a handover decision associated with the handover procedure.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
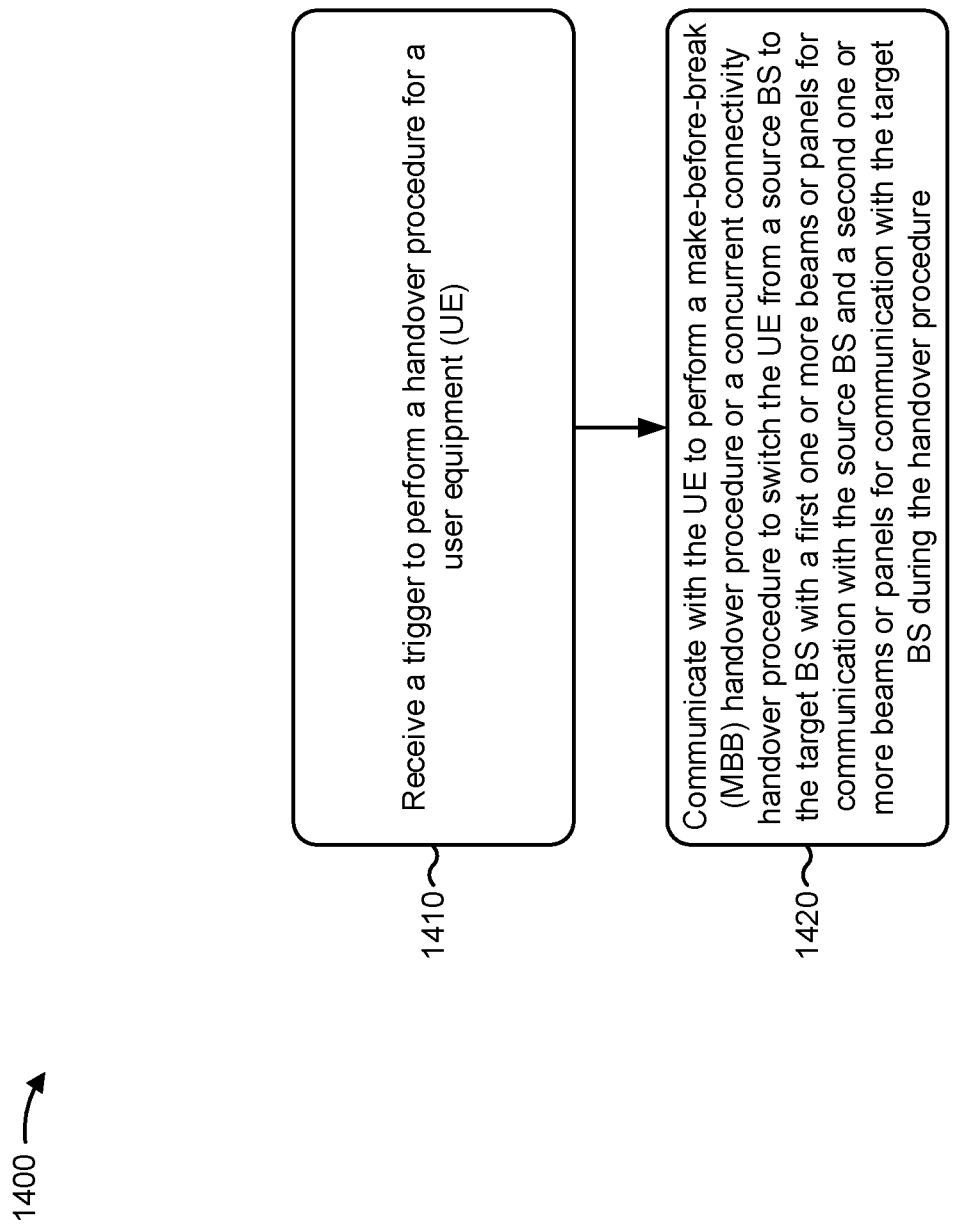
FIG. 14 is a diagram illustrating an example process performed, for example, by a target base station, in accordance with various aspects of the present disclosure.

FIG. 14 is a diagram illustrating an example process 1400 performed, for example, by a BS, in accordance with various aspects of the present disclosure. Example process 1400 is an example where a BS (e.g., BS 110 and/or the like) performs operations associated with UE handovers.

As shown in FIG. 14, in some aspects, process 1400 may include receiving a trigger to perform a handover procedure for a user equipment (UE) (block 1410). For example, the target BS (e.g., using transmit processor 220, receive processor 238, controller/processor 240, memory 242, and/or the like) may receive a trigger to perform a handover procedure for a user equipment (UE), as described above.

As shown in FIG. 14, in some aspects, process 1400 may include communicating with the UE to perform a dual active protocol stack (DAPS) handover procedure or a concurrent connectivity handover procedure to switch the UE from a source BS to the target BS with a first one or more beams or panels for communication with the source BS and a second one or more beams or panels for communication with the target BS during the handover procedure (block 1420). For example, the target BS (e.g., using transmit processor 220, receive processor 238, controller/processor 240, memory 242, and/or the like) may communicate with a user equipment (UE) to perform a dual active protocol stack (DAPS) handover procedure or a concurrent connectivity handover procedure to switch the UE from a source BS to the target BS with a first one or more beams or panels for communication with the source BS and a second one or more beams or panels for communication with the target BS during the handover procedure, as described above.

Process 1400 may include additional aspects, such as any single implementation or any combination of aspects described below and/or in connection with one or more other processes described elsewhere herein.

In a first aspect, the handover procedure is a random access channel-less (RACH-less) handover procedure.

In a second aspect, alone or in combination with the first aspect, the UE is configured to use multi-beam or multi-panel information for a physical uplink shared channel (PUSCH) transmission to the target BS.

In a third aspect, alone or in combination with any one or more of the first through second aspects, the first one or more beams or panels are determined based at least in part on a least one of a transmission configuration indicator (TCI) state, a quasi co-location (QCL) information parameter, or a spatial relation.

In a fourth aspect, alone or in combination with any one or more of the first through third aspects, the first one or more beams or panels are determined based at least in part on an aperiodic layer 1 (L1) measurement report.

In a fifth aspect, alone or in combination with any one or more of the first through fourth aspects, the first one or more beams or panels are determined based at least in part on an explicit indication of the first one or more beams or panels or the second one or more beams or panels.

In a sixth aspect, alone or in combination with any one or more of the first through fifth aspects, the first one or more beams or panels or the second one or more beams or panels are determined based at least in part on at least one of: a prioritization of the source BS or a prioritization of the target BS.

In a seventh aspect, alone or in combination with any one or more of the first through sixth aspects, process 1400 includes communicating at least one signal of the handover procedure using slot aggregation for data in a plurality of slots.

In an eighth aspect, alone or in combination with any one or more of the first through seventh aspects, the slot aggregation information is included with an uplink grant in the handover message or the beam or panel selection message.

In a ninth aspect, alone or in combination with any one or more of the first through eighth aspects, the slot aggregation information is included in a physical downlink control channel (PDCCH) received after a random access channel (RACH) procedure of the handover procedure.

In a tenth aspect, alone or in combination with any one or more of the first through ninth aspects, the slot aggregation information includes information identifying at least one of a slot aggregation indicator, the at least one signal, a multi-beam or multi-panel parameter, a quantity of slots to be aggregated, an aggregation type, a time window for reception of physical downlink shared channels, or a slot identifier.

In an eleventh aspect, alone or in combination with any one or more of the first through tenth aspects, communicating the at least one signal includes receiving a plurality of copies of a physical uplink shared channel.

In a twelfth aspect, alone or in combination with any one or more of the first through eleventh aspects, communicating the at least one signal includes transmitting a plurality of copies of a physical downlink shared channel.

In a thirteenth aspect, alone or in combination with any one or more of the first through twelfth aspects, communicating the at least one signal includes receiving data in the at least one signal that is also transmitted to the source BS.

In a fourteenth aspect, alone or in combination with any one or more of the first through thirteenth aspects, at least a portion of the slot aggregation information is included in a handover message or a beam or panel selection message.

In a fifteenth aspect, alone or in combination with any one or more of the first through fourteenth aspects, process 1400 includes communicating the at least one signal using an uplink grant received by the UE in a signal separate from the handover message or the beam or panel selection message.

In a sixteenth aspect, alone or in combination with any one or more of the first through fifteenth aspects, the uplink grant includes at least a portion of the slot aggregation information.

In a seventeenth aspect, alone or in combination with any one or more of the first through sixteenth aspects, communicating the at least one signal includes communicating a plurality of communications of the at least one signal concurrently or sequentially.

In an eighteenth aspect, alone or in combination with any one or more of the first through seventeenth aspects, the slot aggregation is uplink slot aggregation.

In a nineteenth aspect, alone or in combination with any one or more of the first through eighteenth aspects, communicating that at least one signal includes communicating a random access channel (RACH) message using a plurality of slots.

In a twentieth aspect, alone or in combination with any one or more of the first through nineteenth aspects, at least a portion of the slot aggregation information is transmitted via a downlink RACH message.

In a twenty-first aspect, alone or in combination with any one or more of the first through twentieth aspects, the first one or more beams or panels is determined based at least in part on one or more measurements, and the one or more measurements are UE-triggered measurements.

In a twenty-second aspect, alone or in combination with any one or more of the first through twenty-first aspects, the first one or more beams or panels is determined based at least in part on one or more measurements, and the one or more measurements are BS-triggered measurements.

In a twenty-third aspect, alone or in combination with any one or more of the first through twenty-second aspects, the first one or more beams or panels is determined based at least in part on one or more measurements, and the one or more measurements are performed before a handover decision associated with the handover procedure.

In a twenty-fourth aspect, alone or in combination with any one or more of the first through twenty-third aspects, the first one or more beams or panels is determined based at least in part on one or more measurements, and the one or more measurements are performed after a handover decision associated with the handover procedure.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving, from a source base station (BS), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure; and
performing the handover procedure to switch from the source BS to the target BS with the first one or more beams or panels for communication with the source BS and the second one or more beams or panels for communication with the target BS.

2. The method of claim 1, further comprising:
transmitting a measurement report including information identifying at least one of: a layer 3 (L3) measurement or a layer 1 (L1) measurement; and
wherein receiving the handover message or the beam or panel selection message comprises:
receiving the handover message or the beam or panel selection message based at least in part on transmitting the measurement report.

3. The method of claim 1, further comprising:
receiving a request for an aperiodic layer 1 (L1) measurement report;
transmitting the aperiodic L1 measurement report; and
wherein receiving the handover message or the beam or panel selection message comprises:
receiving the handover message or the beam or panel selection message based at least in part on transmitting the aperiodic L1 measurement report.

4. The method of claim 1, further comprising:
receiving slot aggregation information scheduling data in a plurality of slots; and
communicating at least one signal of the handover procedure using slot aggregation for the data in the plurality of slots.

5. The method of claim 4, wherein communicating the at least one signal comprises:
transmitting a plurality of copies of a physical uplink shared channel.

6. The method of claim 4, wherein communicating the at least one signal comprises:
receiving a plurality of copies of a physical downlink shared channel.

7. The method of claim 4, wherein communicating the at least one signal comprises:
transmitting data in the at least one signal to the source BS and the target BS.

8. The method of claim 4, further comprising:
receiving an uplink grant in a signal separate from the handover message or the beam or panel selection message; and
wherein communicating the at least one signal comprises:
communicating the at least one signal using the uplink grant.

9. The method of claim 4, wherein communicating the at least one signal comprises:
communicating a plurality of communications of the at least one signal concurrently or sequentially.

10. The method of claim 4, wherein communicating the at least one signal comprises:
communicating a random access channel (RACH) message using the plurality of slots.

11. A method of wireless communication performed by a source station (BS), comprising:
transmitting, to a user equipment (UE), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure; and
performing the handover procedure to switch the UE from the source BS to the target BS with the first one or more beams or panels for communication with the source BS and the second one or more beams or panels for communication with the target BS.

12. The method of claim 11, further comprising:
receiving a measurement report including information identifying at least one of: a layer 3 (L3) measurement or a layer 1 (L1) measurement; and
wherein transmitting the handover message or the beam or panel selection message comprises:
transmitting the handover message or the beam or panel selection message based at least in part on receiving the measurement report.

13. The method of claim 11, further comprising:
transmitting a request for an aperiodic layer 1 (L1) measurement report;
receiving the aperiodic L1 measurement report; and
wherein transmitting the handover message or the beam or panel selection message comprises:

transmitting the handover message or the beam or panel selection message based at least in part on receiving the aperiodic L1 measurement report.

14. The method of claim 11, further comprising:
transmitting slot aggregation information scheduling data in a plurality of slots; and
communicating at least one signal of the handover procedure using slot aggregation for the data in the plurality of slots.

15. The method of claim 14, wherein communicating the at least one signal comprises:
receiving a plurality of copies of a physical uplink shared channel.

16. The method of claim 14, wherein communicating the at least one signal comprises:
transmitting a plurality of copies of a physical downlink shared channel.

17. The method of claim 14, wherein communicating the at least one signal comprises:
receiving data in the at least one signal that is also transmitted to the target BS.

18. The method of claim 14, further comprising:
transmitting an uplink grant in a signal separate from the handover message or the beam or panel selection message.

19. The method of claim 14, wherein communicating the at least one signal comprises:
communicating a plurality of communications of the at least one signal concurrently or sequentially.

20. A method of wireless communication performed by a target base station (B S), comprising:
receiving a trigger to perform a handover procedure for a user equipment (UE); and
communicating with the UE to perform a dual active protocol stack (DAPS) handover procedure or a concurrent connectivity handover procedure to switch the UE from a source B S to the target BS with a first one or more beams or panels for communication with the source BS and a second one or more beams or panels for communication with the target BS during the handover procedure,
wherein communicating with the UE to perform the DAPS handover procedure or the concurrent connectivity handover procedure comprises:
communicating at least one signal, of the handover procedure, using an uplink grant received by the UE in a signal separate from a handover message or a beam or panel selection message that includes multi-beam or multi-panel information identifying that the first one or more beams or panels are to remain with the source BS during the DAPS handover procedure or the concurrent connectivity handover procedure.

21. The method of claim 20, wherein communicating the at least one signal comprises:
communicating the at least one signal using slot aggregation for data in a plurality of slots based at least in part on slot aggregation information provided to the UE.

22. The method of claim 20, wherein communicating the at least one signal comprises:
receiving a plurality of copies of a physical uplink shared channel.

23. The method of claim 20, wherein communicating the at least one signal comprises:
transmitting a plurality of copies of a physical downlink shared channel.

24. The method of claim 20, wherein communicating the at least one signal comprises:
receiving data in the at least one signal that is also transmitted to the source BS.

25. The method of claim 20, wherein communicating the at least one signal comprises:
communicating a plurality of communications of the at least one signal concurrently or sequentially.

26. The method of claim 20, wherein communicating the at least one signal comprises:
communicating a random access channel (RACH) message using a plurality of slots.

27. A user equipment (UE) for wireless communication, comprising:
a memory; and
one or more processors, coupled to the memory, configured to:
receive, from a source base station (BS), a handover message or a beam or panel selection message including multi-beam or multi-panel information identifying a first one or more beams or panels to remain with the source BS and a second one or more beams or panels to switch from the source BS to a target BS during a dual active protocol stack (DAPS) handover procedure or a concurrent connectivity handover procedure; and
perform the handover procedure to switch from the source BS to the target BS with the first one or more beams or panels for communication with the source BS and the second one or more beams or panels for communication with the target BS.

28. The UE of claim 27, wherein the one or more processors are further configured to:
transmit a measurement report including information identifying at least one of: a layer 3 (L3) measurement or a layer 1 (L1) measurement; and
wherein receiving the handover message or the beam or panel selection message comprises:
receive the handover message or the beam or panel selection message based at least in part on transmitting the measurement report.

29. The UE of claim 27, wherein the one or more processors are further configured to:
receive a request for an aperiodic layer 1 (L1) measurement report;
transmit the aperiodic L1 measurement report; and
wherein receiving the handover message or the beam or panel selection message comprises:
receive the handover message or the beam or panel selection message based at least in part on transmitting the aperiodic L1 measurement report.

* * * * *